(12) United States Patent
Rodriguez, II

(10) Patent No.: US 10,311,644 B2
(45) Date of Patent: *Jun. 4, 2019

(54) SYSTEMS AND METHODS FOR CREATING AND SHARING A 3-DIMENSIONAL AUGMENTED REALITY SPACE

(71) Applicant: Jonathan M. Rodriguez, II, Los Angeles, CA (US)

(72) Inventor: Jonathan M. Rodriguez, II, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,086

(22) Filed: Jun. 17, 2017

(65) Prior Publication Data

US 2018/0165885 A1 Jun. 14, 2018

Related U.S. Application Data

(63) Continuation-in-part of application No. 15/378,985, filed on Dec. 14, 2016, now abandoned.

(51) Int. Cl.
| | | |
|---|---|---|
| *G06T 19/00* | (2011.01) | |
| *G06F 3/0481* | (2013.01) | |
| *H04W 4/02* | (2018.01) | |
| *H04W 4/20* | (2018.01) | |
| *H04L 29/06* | (2006.01) | |
| *H04W 4/029* | (2018.01) | |

(52) U.S. Cl.
CPC ........ *G06T 19/006* (2013.01); *G06F 3/04815* (2013.01); *H04L 67/38* (2013.01); *H04W 4/023* (2013.01); *H04W 4/20* (2013.01); *H04W 4/026* (2013.01); *H04W 4/027* (2013.01); *H04W 4/029* (2018.02)

(58) Field of Classification Search
None
See application file for complete search history.

(56) References Cited

U.S. PATENT DOCUMENTS

| | | | | | |
|---|---|---|---|---|---|
| 4,366,565 | A | * | 12/1982 | Herskowitz | G02B 6/4206 385/24 |
| 6,072,498 | A | * | 6/2000 | Brittain | G06T 15/00 345/428 |
| 2004/0125776 | A1 | * | 7/2004 | Haugli | H04L 12/12 370/338 |
| 2012/0092328 | A1 | * | 4/2012 | Flaks | G02B 27/017 345/419 |
| 2013/0009994 | A1 | * | 1/2013 | Hill | G06N 3/006 345/633 |

(Continued)

*Primary Examiner* — Edward Martello

(57) ABSTRACT

A 3-dimensional augmented reality (AR) world is a version of our "real" physical world augmented with virtual 3D objects that may be experienced by a user, such as someone who "sees" the virtual 3D objects through a smartphone or special eyewear. A shared 3D AR world is one in which multiple individuals can simultaneously experience the same augmented reality, even if they are not using the same devices. The shared 3D AR world is created by obtaining and synthesizing sensory and other inputs from various devices in use by different users, and providing augmented outputs adapted to different devices. The synthesis of a wide range of inputs allows the augmented reality effects to be realistic. The augmented reality effects may be pre-rendered by a cloud-based server to reduce the computational burden on user devices.

3 Claims, 7 Drawing Sheets

(56) References Cited

U.S. PATENT DOCUMENTS

| | | | | |
|---|---|---|---|---|
| 2013/0044130 A1* | 2/2013 | Geisner | ............... | G09G 5/00 345/633 |
| 2014/0375688 A1* | 12/2014 | Redmann | ............ | G06T 19/006 345/633 |
| 2015/0296446 A1* | 10/2015 | Fischer | ............ | H04W 52/0254 370/338 |
| 2017/0206707 A1* | 7/2017 | Guay | ............... | G06F 17/30327 |

* cited by examiner

SYSTEMS AND METHODS FOR CREATING AND SHARING A 3-DIMENSIONAL AUGMENTED REALITY SPACE

CROSS-REFERENCE TO RELATED APPLICATIONS

This application claims the benefit of U.S. Provisional Application No. 62/266,823, filed on Dec. 14, 2015 and U.S. application Ser. No. 15/378,985, filed on Dec. 14, 2016.

BACKGROUND OF THE INVENTION

This invention relates generally to the creation of a shared 3-dimensional augmented reality (AR) world.

A 3D AR world is a version of our "real" physical world augmented with virtual 3D objects that may be experienced using any number of devices, such as a headset that allows a wearer to see a fire-breathing dragon at the park and hear its roars as though the dragon truly exists in physical reality. The just referenced dragon is an example of additive augmentation. The augmentation of reality may be subtractive, and remove from view objects that exist in the physical world. The augmentation of reality may also modify the appearance of physical objects in the world.

A shared 3D AR world is one in which multiple individuals can simultaneously experience the same augmented reality. Thus, instead of the dragon being seen by just a single person at the park, it can be seen by everyone there. The shared 3D AR space can be experienced using a wide range of devices, such as goggles, smartphones, or large windows or displays.

BRIEF SUMMARY OF THE INVENTION

Described herein are systems and methods for creating and sharing a 3D AR world. The 3D AR world is shared by multiple users. It is created by obtaining and synthesizing inputs from a wide range of devices and it is accessible on a wide range of devices.

DETAILED DESCRIPTION OF THE INVENTION

A space in the shared 3D AR world is created by sharing and synthesizing information collected by devices and sensors in approximate proximity to each other. For instance, modern smartphones commonly incorporate GPS, accelerometer, and gyroscopic sensors in addition to local and wide area networking capabilities. Drones may have constant-on cameras that record images correlated with altitude, location, and orientation. Such information may be used as inputs to a computational process that generates a highly realistic AR object. The more devices and types of devices that are present and sharing information, the more realistic the 3D AR effects will be.

Sharing a Realistic 3D AR Space

The 3D AR world is generated by computing processes that take into account the available inputs and resources in a particular physical location.

Figure 1:
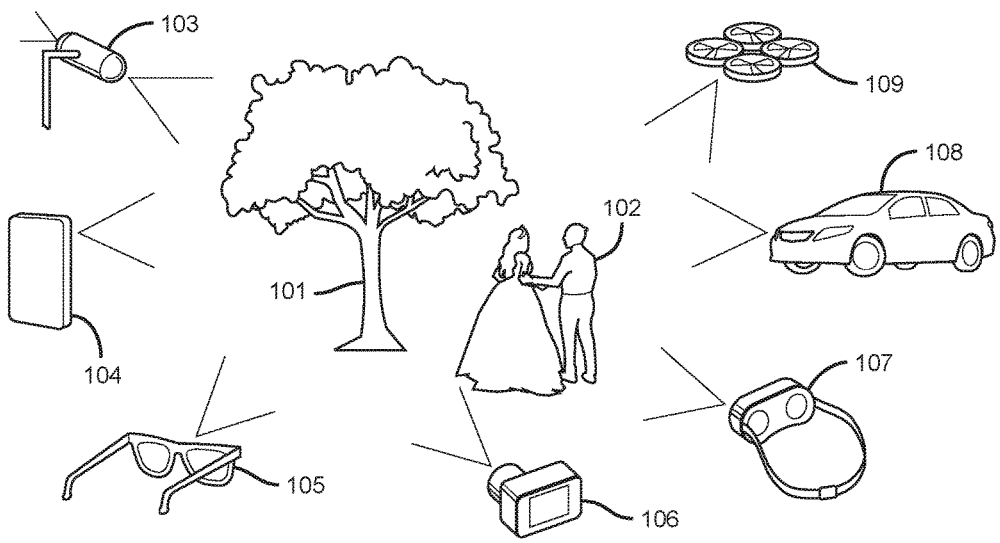
FIG. 1 illustrates an example of a physical location with several devices that are able to contribute information to and share in the 3D AR world.

FIG. 1 illustrates an example of a physical location with several devices that are able to contribute information to and share in the 3D AR world. The location includes a tree 101 and two individuals 102 standing nearby. The two individuals are wearing fitness trackers that gather information concerning their movements. Camera 103, smartphone 104, eyewear 105, sports camera 106, goggles 107, car 108, and drone 109 all have cameras with different views upon the scene depending on their positions. The fitness trackers worn by individuals 102 also may be equipped with cameras. Each of these devices may also have sensors and other components that sense data regarding its own movements and position, such as GPS, accelerometers, gyroscopes, and altimeters. That is, each of these devices may collect data regarding its environment, including the positions, attributes, and movement of other objects in the environment, and its own position and movement relative to the environment.

Each of these devices may be equipped with one or more wireless transceivers to transmit and receive information and one or more microprocessors, which may be general purpose or designed to facilitate specific types of computations. For instance, the microprocessors may be dedicated coprocessors for sensory data or be designed for highly parallelized computations such as graphics processor units.

Figure 2:
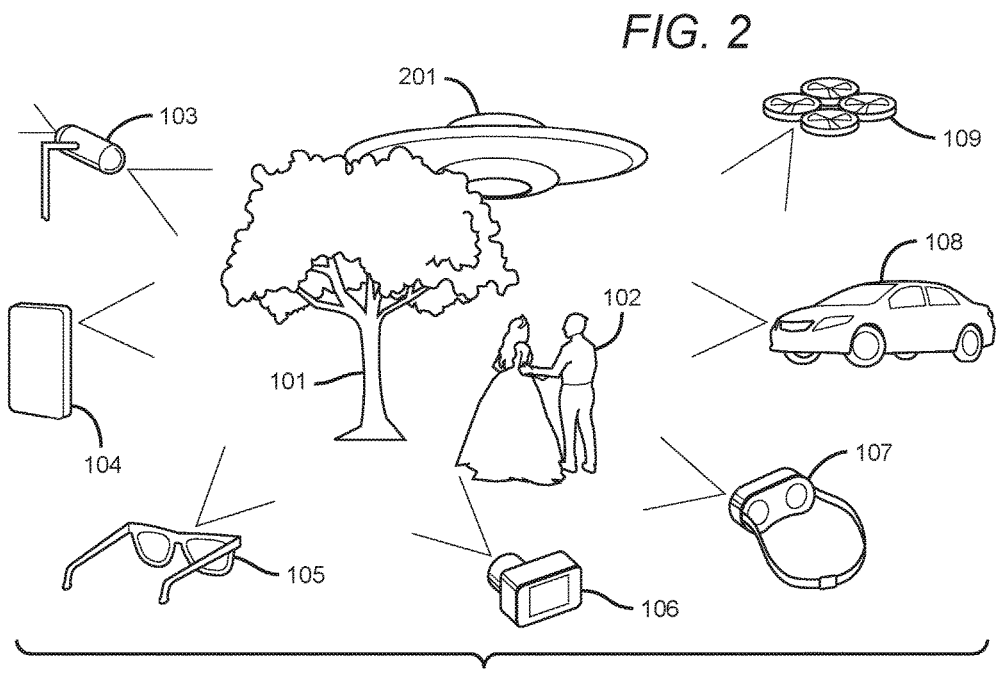
FIG. 2 illustrates the same physical location as FIG. 1, now augmented with a 3D virtual object.

FIG. 2 illustrates the same physical location, now augmented with a flying saucer 201 next to the tree. The flying saucer may be "placed" there in an AR sense by any computing device accessible by devices in the vicinity of the physical location, such as by smartphone 104. In turn, the other devices in the vicinity "accept" the augmentation of the physical space by the smartphone, such that users of the other devices will "see" the flying saucer as well, from their particular vantage points. In this sense, the devices in this location have agreed upon a single shared AR "reality."

AR content can be shared in a variety of ways, such as peer-to-peer connections between devices, or accessible via one or more online directories of content objects. Instead of smartphone 104, the AR flying saucer in FIG. 2 may be placed in the scene by a cloud-based server on the Internet accessed by the devices in the vicinity.

When an AR object is being presented by a cloud-based server to one or more devices, the server can reduce the computational burden on the devices, and may also enhance the artistic quality of the rendering, by pre-rendering a multitude of views of the object from different vantage points at the current moment. The multitude of views of the object may incorporate real-time environmental effects such as lighting and shadow, weather, and atmospheric effects that are correct for the current time of day, weather, and season, and are specific to each vantage point. Such real-time environmental effects not only increase the realistic nature of a virtual object, but can help to convey a sense of distance, location and orientation. With reference to FIG. 2, the device 104 queries a cloud-based server for the latest rendering of the object 201 for the device's position, such as GPS location and compass bearing, and time of photography. The cloud-based server responds with imagery containing one or more of these effects.

Figure 8A:
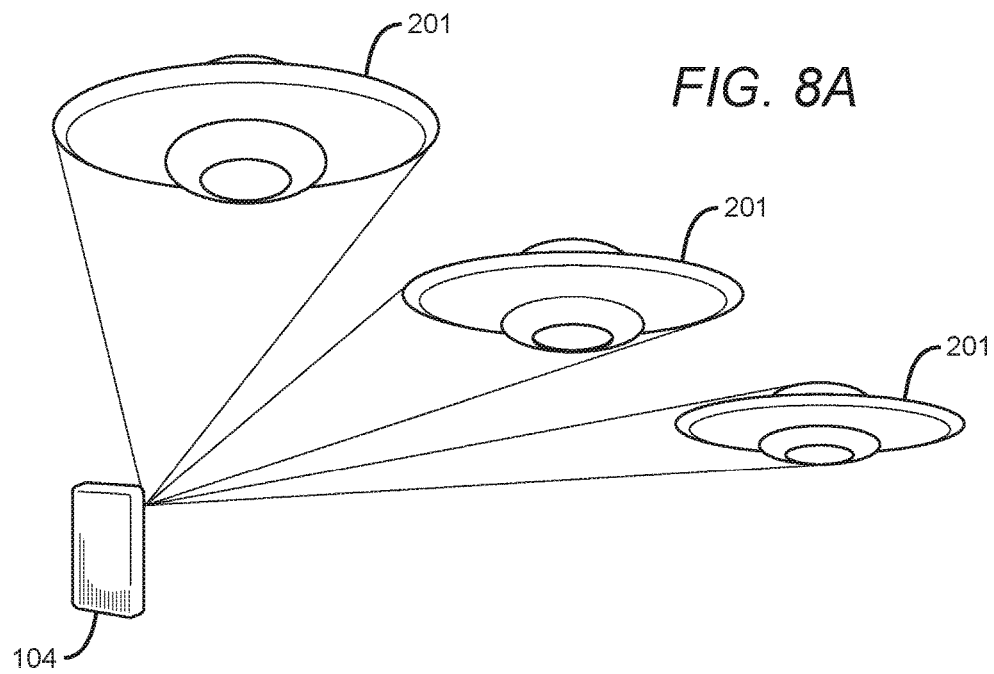
FIG. 8A illustrates a device having different vantage points to a 3D virtual object due to the object being placed in different positions.

FIG. 8A shows object 201 being placed in different positions relative to device 104, for instance to convey the sense that object 201 is moving, which changes the vantage point that device 104 has on the object 201. Object 201 may be rendered differently by the server for display by device 104 depending on the vantage point.

Figure 8B:
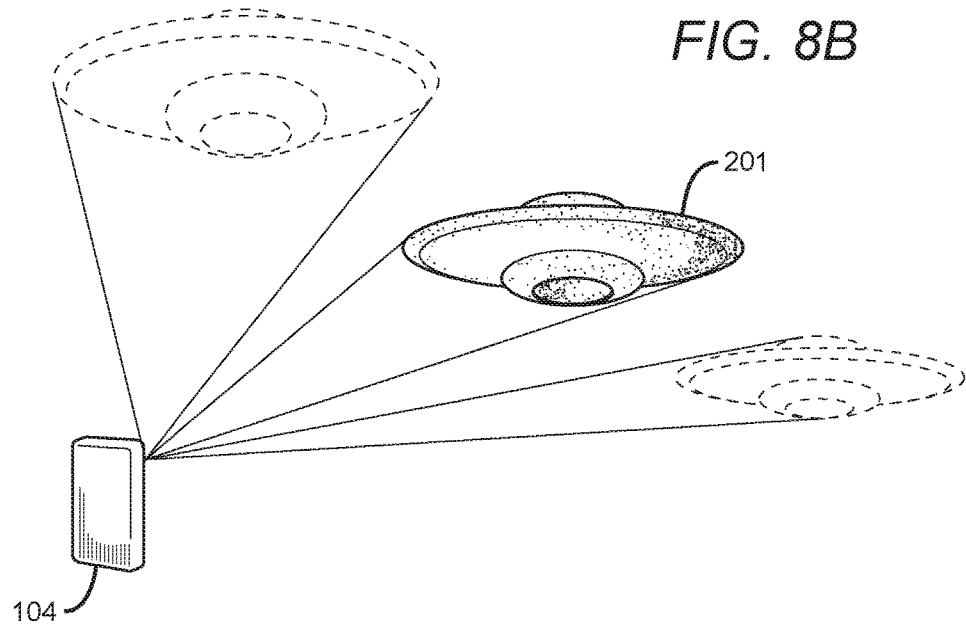
FIG. 8B illustrates a device having different vantage points to a 3D virtual object and the object being rendered with appropriate sunlight and shadow based on time of day.
Figure 8C:
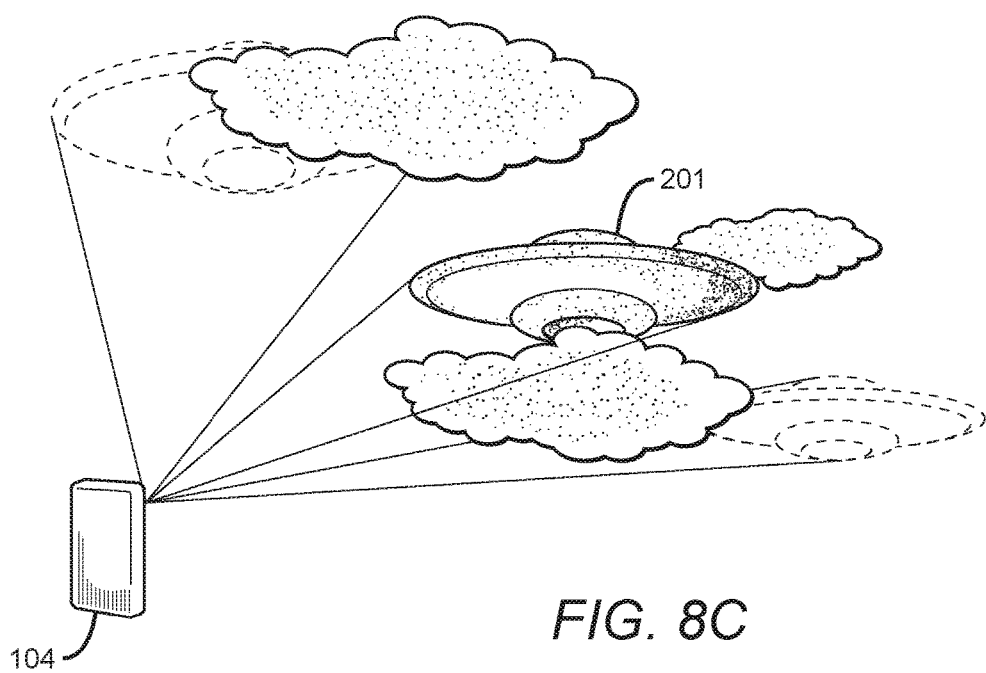
FIG. 8C illustrates a device having different vantage points to a 3D virtual object and the object being rendered with added real-time weather effects.
Figure 8D:
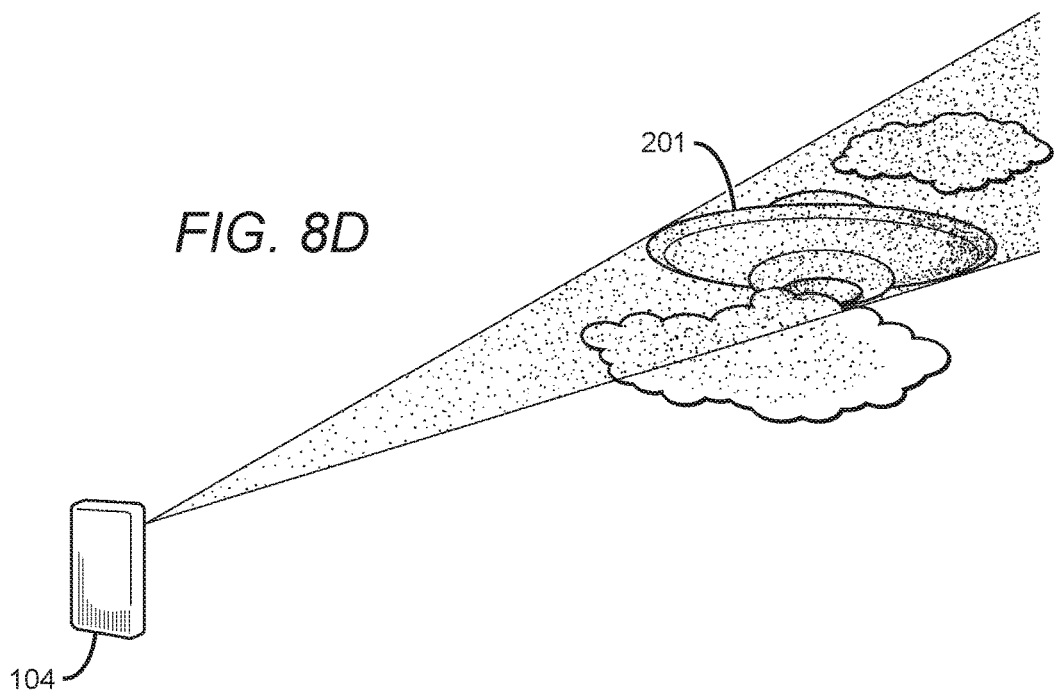
FIG. 8D illustrates a device having a single vantage point to a 3D virtual object and the object being rendered with added atmospheric haze and tint within the device's field of view to convey the sense of distance.

FIGS. 8B, 8C, and 8D show rendering of the object 201 with various types of real-time environmental effects.

FIG. 8B shows rendering of the object 201 with appropriate sunlight and shadow based on time of day.

FIG. 8C shows rendering of the object with added real-time weather effects, such as clouds.

FIG. 8D shows rendering of the object with added atmospheric haze and tint to the imagery within the device's field of view to convey a sense of a far vantage point and to improve the sense of distance. A blue tint may be particularly effective to conveying the sense of a far vantage point.

Figure 9A:
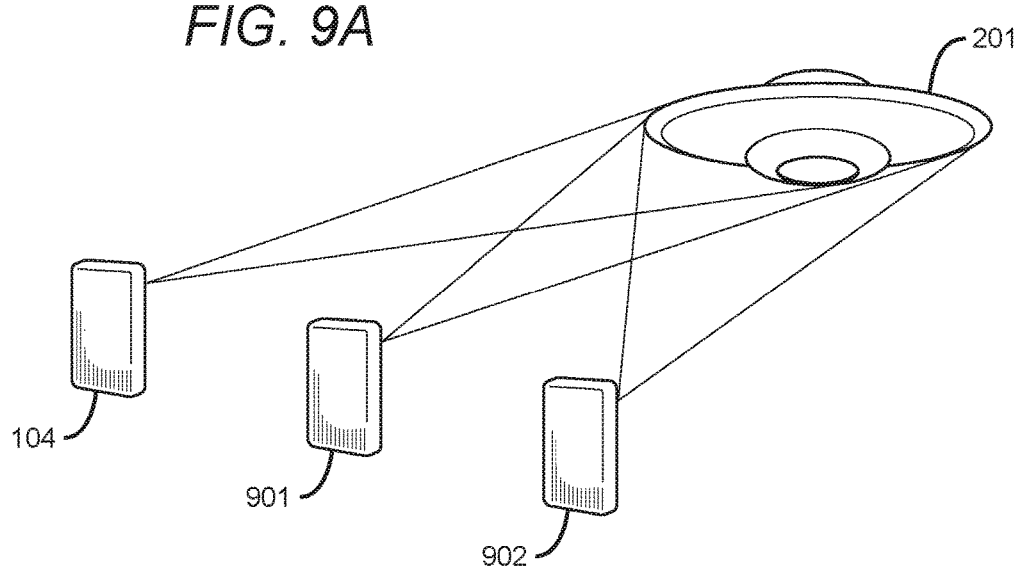
FIG. 9A illustrates a plurality of devices having different vantage points to a 3D virtual object.

A plurality of devices may have different views of the same object. In FIG. 9A, device 104, device 901, and device 902 are devices with similar capabilities but having different vantage points to the object 201. A server may provide different renderings of object 201 to device 104, device 901, and device 902 consistent with their different vantage points.

Figure 9B:
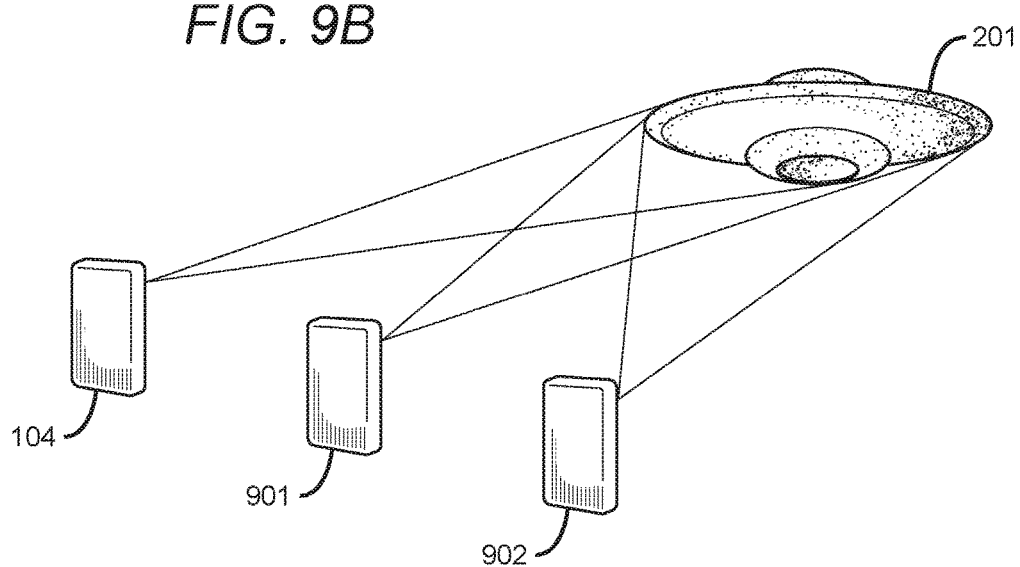
FIG. 9B illustrates a plurality of devices having different vantage points to a 3D virtual object and the object being rendered with appropriate sunlight and shadow based on time of day.
Figure 9C:
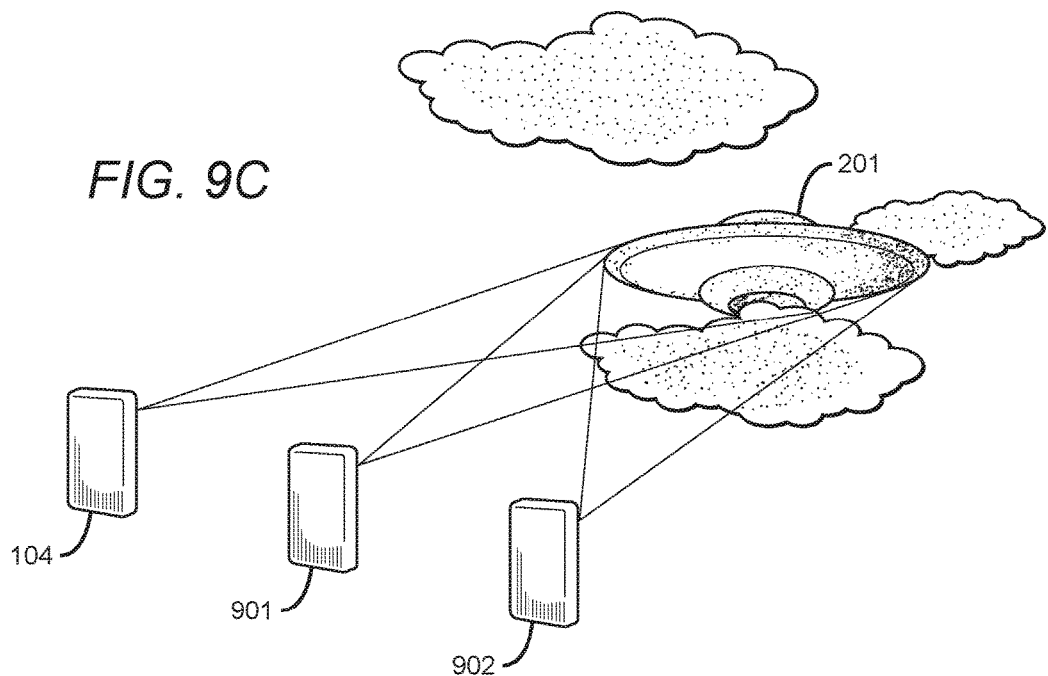
FIG. 9C illustrates a plurality of devices having different vantage points to a 3D virtual object and the object being rendered with added real-time weather effects.
Figure 9D:
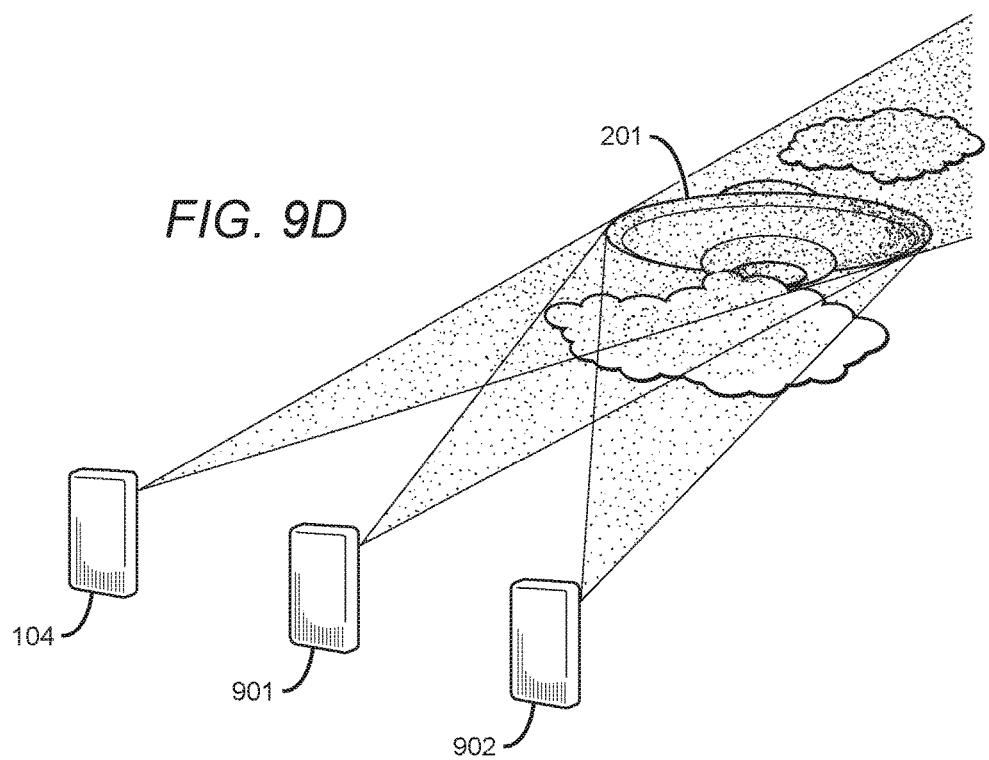
FIG. 9D illustrates a plurality of devices having different vantage points to a 3D virtual object and the object being rendered with added atmospheric haze and tint within the devices' fields of view to convey the sense of distance.

FIGS. 9B, 9C, and 9D show rendering of the object 201 with various types of real-time environmental effects that are customized for the different vantage points of the devices.

FIG. 9B shows rendering of the object with appropriate sunlight and shadow based on time of day. Each of device 104, device 901, and device 902 has a different view of the sunlight and shadow effects.

FIG. 9C shows rendering of the object with added real-time weather effects, such as clouds. Each of device 104, device 901, and device 902 has a different view of the real-time weather effects.

FIG. 9D shows rendering of the object with added atmospheric haze and tint to the imagery within the devices' fields of view to convey a sense of a far vantage point and to improve the sense of distance. Each of device 104, device 901, and device 902 may have a different view of the atmospheric haze and tint.

To spur adoption of augmented reality and facilitate the building of communal spaces within augmented reality, it may be considered important to build the notion that there is a canonical "real" world of content in augmented reality that all devices agree on regardless of device type, their manufacturers, operating systems, platforms, or ecosystems.

In addition to accepting each other's augmented reality projections, these devices may also collaborate to improve the realism of the augmented reality effects. These devices share real-time data with each other regarding visual, auditory, and other information collected by their cameras and other sensors, such as radar or sonic sensors, and any available information about their location and orientation, in order to together accomplish a fully 3-dimensional realistic view of the scene. In other words, in attempting to render the augmented reality scene in a convincing fashion, each device is not limited to only the data directly captured by it, but may make use of the data captured by other devices in the vicinity.

To save bandwidth and protect the privacy of what people are looking at, the data streams may be shared in a highly compressed or redacted format. For instance, with respect to visual information, the devices may share only information regarding detected feature points (e.g., scale-invariant feature transform or SIFT features) and not full visual streams.

The 3D AR world may utilize the capabilities of every available device, e.g., cameras or visual sensors, LIDAR, stereo camera pair, stereo camera pair with active patterned illumination, time-of-flight sensor, radar, sonar, navigation systems (e.g., GPS, GLONASS), localization by using Wi-Fi, Bluetooth, Bluetooth Low Energy, or other wireless signals (e.g., by SSID, signal strengths, or ping times, beacons), accelerometer, gyroscope, magnetometer, barometer, infrared camera, structured light sensor, tactile sensors, or any other technology that captures or reflects information regarding the world.

The 3D AR world may be supported (e.g., AR objects may be viewed or heard by a user) by any type of device that offers sensory outputs such as visual, auditory, and tactile outputs, including traditional computing devices such as phones, tablets, desktop and notebook computers; wearable devices such as eyeglasses and contact lenses, visors, goggles, headsets, watches, wristbands, bracelets; windows such as those in buildings or car windshields; 2D or 3D displays or projectors; and haptic suits.

With respect to the 3D AR user interface for eyewear, there are advantages to displaying information near the bottom of the user's field of view, as opposed to the top. One reason is that it is more ergonomic for a person to look downwards rather than upwards. Another reason is that looking slightly downwards has a societal connotation that one is looking at information, which has become commonplace particularly with the advent of smartphones and smartwatches.

A series of complex computations are necessary to make realistic 3D objects in AR space. It is necessary to align (or register) the point clouds of the physical space from every device and combine them into a canonical world map that is relied upon by each device. The processing would use every other device's information to "clean up" each device's point cloud. For instance, a device may use information from other devices to help it perform operations such as rejection of bad points, refinement of point locations, increasing point confidence, or refine its notion of a point's innate color (such as to remove effects of specular lighting). The computation can be distributed or parallelized across multiple devices. The computation also may be performed by a single device, such as a device identified as having the most available computational resources or most available battery life, or it may be performed by a server in the cloud. The more devices that share information and participate in the 3D AR world, the more realistic the 3D AR world can be. Participating devices effectively supplement each other's capabilities.

Absolute and Relative Coordinate Systems in the Shared 3D AR World

Satellite-based navigation technologies such as GPS provide fairly accurate and precise absolute location data, and thus are useful to make an absolute coordinate system for the 3D AR world. However, GPS may not always be available to the devices in a particular location, or it may be desirable not to use GPS in certain circumstances, even if otherwise available, for power efficiency or other reasons. Depending on the circumstances, GPS, even if available, may not be necessary to make a realistic 3D AR scene, such as if the 3D AR scene is created within a constrained indoor space and there is sufficient non-GPS-based location information for the scene.

Where GPS is not available or not used, an absolute coordinate system may not be available, but devices sharing in a 3D AR space may agree on a relative coordinate system that allows AR objects to be positioned in a consistent and agreed-upon fashion.

Device Tracking

Devices that are capable of tracking themselves may share with other devices information regarding their position, such as their location and orientation in space and position confidence regarding each dimension of their location and orientation. Whenever possible, devices should track other devices in their vicinity, and ideally should share the estimated positions and confidences of each device with every other device. This sharing of the position of the tracked device should ideally be done in terms of the relative position of the tracked device so that devices that receive this device-to-device relative position information can more easily cross-correlate all available information to determine a ground truth.

Devices can track each other in a variety of ways, including 2D or 3D visual tracking (e.g., by using an advertised or known appearance of the tracked device that can be advertised by the tracked device), sonic or ultrasonic pings, radio pings, correlation and comparison of relative perceived volume or flight time of ambient sound or radio sources, emissions of a trackable visual signature by the tracked device (such as a pattern of LED blinks or an image or video on a screen (including signatures emitted solely for the purpose of tracking or signatures emitted in the course of the normal operations of the device (e.g., the contents or redacted contents of the screen of a smartphone).

Figure 3:
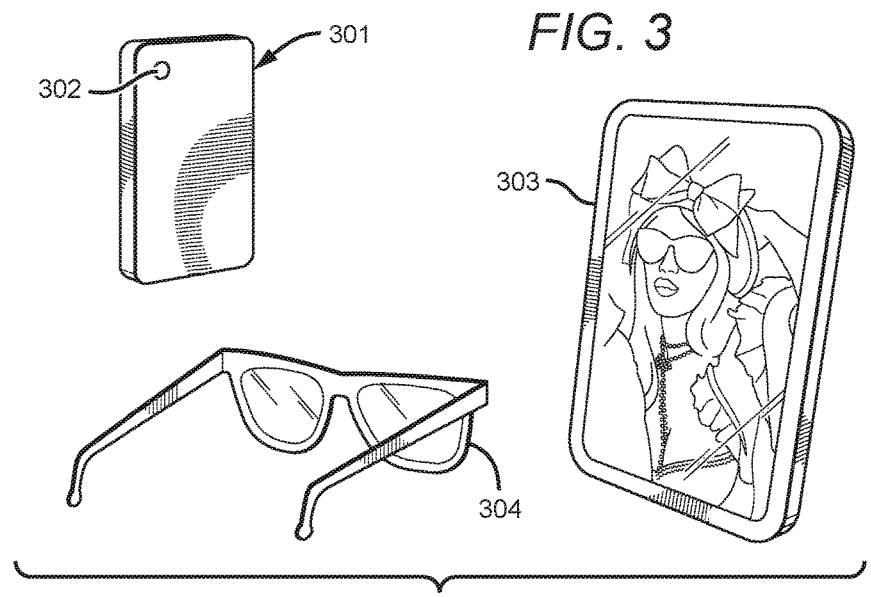
FIG. 3 illustrates an example of a technique for device-to-device relative spatial tracking, by intentional use of flashing LED patterns, visible screen graphics, and physical attributes as trackable temporal or spatial signatures.

FIG. 3 illustrates a technique for device-to-device relative spatial tracking by intentional use of flashing LED patterns, visible screen graphics, and physical attributes as trackable temporal or spatial signatures. Phone 301 has an LED 302 that flashes according to a specific timing pattern. The pattern may be selected to be unique among devices within a particular physical location. Phone 301 may also transmit a separate wireless signal that identifies its LED flash pattern so that other devices (tablet 303 and eyewear 304) may more easily use it to track phone 301. Tablet 303 optionally transmits its screen contents to further assist in tracking; the transmitted screen contents may be redacted or made low resolution to protect user privacy. Eyewear 304 transmits a signal to provide information regarding its physical appearance, such as the shape and color of its frame and the color of its lenses.

Phone 301 has a camera that identifies and tracks eyewear 304 based on its physical appearance, assisted by the information provided by the eyewear. Eyewear 304 identifies and tracks phone 301 using the phone's LED flash pattern. Eyewear 304 tracks tablet 303 based on its screen contents; if tablet 303 has also chosen to transmit its screen contents (possibly redacted and/or low resolution) in a wireless signal, eyewear 304 may use this information in conjunction with its own image of the screen of tablet 303 to assist in tracking the location and/or orientation of tablet 303.

Device to Device Communications

Devices can communicate with each other using any number of networking technologies, including IEEE 802.11 or Wi-Fi, Wi-Fi Direct, Bluetooth, Bluetooth Low Energy, optical communications, wired connections, or other personal area networking, local area networking, or wide area networking technologies. A device may simultaneously support and have active connections using a plurality of these technologies.

Devices can communicate with each other using any number of networking topologies. For instance, devices can communicate with each on a peer-to-peer basis or may communicate through intermediaries.

Figure 4:
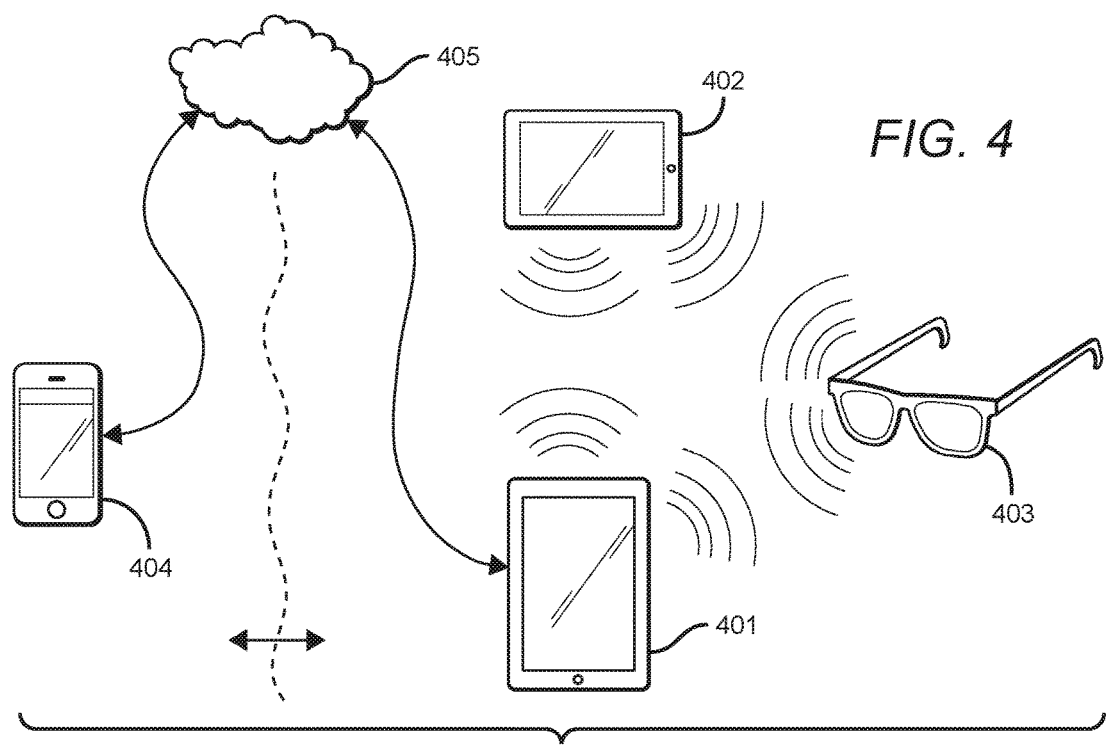
FIG. 4 illustrates peer-to-peer communications between devices sharing in the 3D AR world.

FIG. 4 illustrates peer-to-peer communications between devices—an iPhone 401, an Android tablet 402, and eyewear 403 running a custom operating system. It also illustrates that a phone 404 that is out of range for a local peer-to-peer connection with iPhone 401 may nevertheless communicate with iPhone 401 through the Internet 405 or other wide area network. Each of these devices share information with each other to collaboratively create a 3D AR world.

Figure 5:
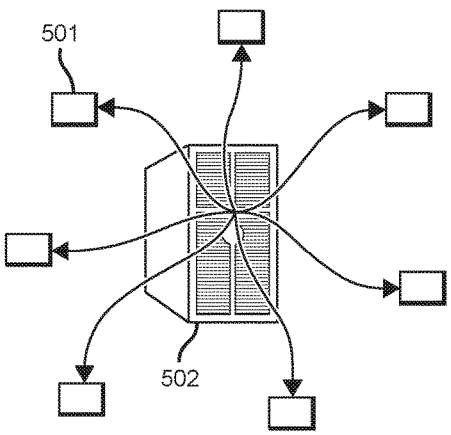
FIG. 5 illustrates devices sharing information with each other by communicating with a central hub.

FIG. 5 illustrates devices 501 that share information with each other by communicating with a central hub 502. The hub receives inputs from all devices and transmits outputs to all devices.

Figure 6:
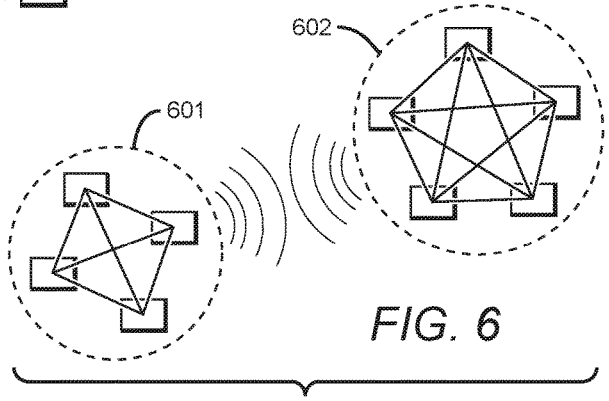
FIG. 6 illustrates groups of devices connected to each other on a peer-to-peer basis.

FIG. 6 illustrates groups 601 and 602 of devices connected to each other on a peer-to-peer basis. Although not all of the devices are close enough to communicate with each other, the two groups include devices that are close enough to communicate and thus connect the two groups.

Information Sharing Between 3D AR-Enabled Devices

3D AR-enabled devices communicate with each other using agreed-upon communication protocols. Devices may transmit data to each other using one or more data packets or protocol data units. It would be ideal for a single set of 3D AR protocols to be supported by all device manufacturers and operating systems. To the extent that multiple types of protocols or multiple data formats are used, it would be ideal for maximum interoperability for devices to be able to read and process multiple data formats and malformed or non-standard data packets.

It would be ideal for any data format or formats to be flexible to account for the variety of information that may be transmitted, and extensible to future technological developments. While the specific definition and arrangement of fields within data packets is an implementation detail within the scope of the present invention, the information to be communicated by 3D AR-enabled devices may include one or more of the following:

Device identification, which may be anonymized and changed periodically for user privacy.

Time of transmission, which may be used by devices to calculate device-to-device communication latency.

Signal transmission strength, possibly inserted by a physical layer operation, which a receiving device may compare to actual received signal strength to assess device-to-device channel quality or physical distance.

One or more known dimensions of a device's location and orientation, along with tolerances and confidence levels for each. Examples of such dimensions include latitude, longitude, altitude, compass bearing, inclination above or below the horizon, and pitch/yaw/roll.

Information regarding the appearance and capabilities of the device, which may be its true physical form or a different form that the device would like to manifest in the AR world. Examples of such information include 3D models, animations, sounds, and interaction modalities.

Characteristics of the device that other devices can use to identify and track it, such as shape, paint color, content being displayed on any outward facing screen or sounds being emitted by the device's speakers (optionally redacted or resolution-reduced to mitigate privacy concerns), and LED flash patterns.

Captured or computed visual or auditory information, such as the estimated location, brightness, color, feature descriptor, sound, size, and/or any other properties (optionally including tolerances and confidence levels) of any detected 3D points, features, surfaces, objects, light sources, sound sources, landmarks, radios, beacons, etc., that the device has detected and localized in physical reality.

Information regarding other devices with which a device is in communication or is tracking. For instance, a device may transmit information it has ascertained or received regarding the locations and orientations of other devices. A device may also forward or rebroadcast data packets received from another device to effectively boost the range and/or protocol-interoperability of the original sending device.

Information regarding an AR object being manifested or placed in the 3D AR space by a device may include the following:

The "physical" attributes of the AR object, such as 3D models, animations, sounds, and material properties (e.g., hardness, texture, mass).

Location and orientation of the AR object, given in either absolute terms (e.g., latitude and longitude) or relative terms (e.g., on top of the center of a table in a room).

Capabilities and interaction modalities of the AR object. For instance, an AR sword may be "sharp" and be able to cut other AR objects, while an AR watermelon may be able to be cut by sharp AR objects.

Interactions that an AR object wants to send to another AR object. An AR sword may send a "cut" action to an AR watermelon when they come into contact. Such actions may also be automatically ascertained by the AR world based on known properties of the AR objects—e.g., a sword is sharp and a watermelon is soft.

Amount of time that the AR object should persist in the AR space if the device manifesting the AR object loses its network connection or stops transmitting. This feature can be utilized by the transmitting device to save power, e.g., by transmitting data regarding static AR objects only rarely or by transmitting data regarding dynamic AR objects only when it should be animated.

Content tags, such as whether the AR object is a commercial advertisement.

Any particular transmission by a device may optionally include only a subset of the above described information. For instance, a device may transmit a 3D model of itself or an AR object infrequently—perhaps only when new devices are detected in its vicinity—while it may transmit location and orientation updates more frequently.

Graceful Degradation of Content

The 3D AR world may be accessed using a variety of devices with different capabilities. Each device should present AR objects to the best of its capabilities and to the extent a device is not able to present an AR object with perfect fidelity, it should "degrade" the AR object gracefully by presenting its best representation of the AR object.

Figure 7:
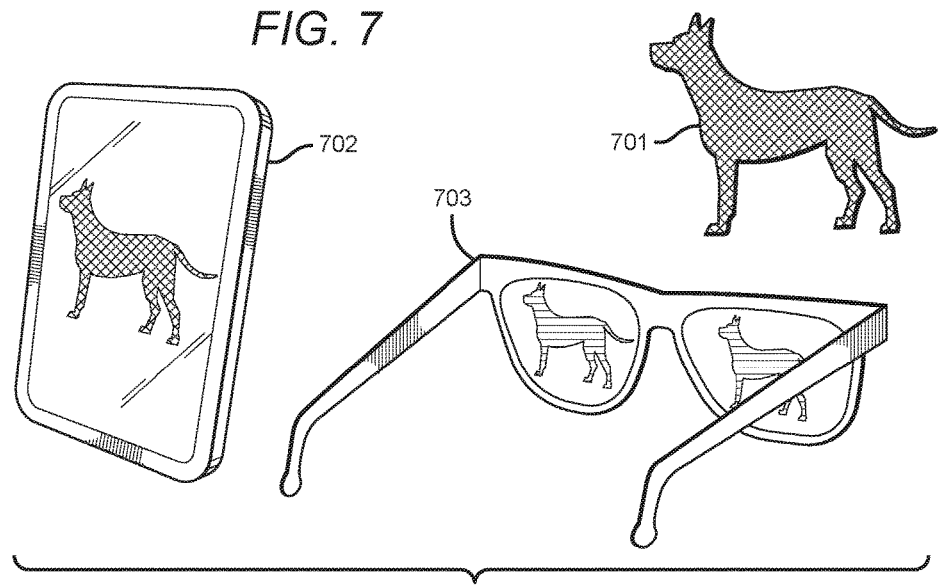
FIG. 7 illustrates the graceful degradation of content on devices with lesser rendering capabilities.

FIG. 7 illustrates the graceful degradation of content on devices with lesser rendering capabilities. The AR dog 701 has a "true" form of being black-colored. A smartphone 702 utilizing virtual/digital AR technology renders a black dog. However, eyewear 703 using additive optical AR technology may not be capable of rendering true black, and may instead render a best-effort representation of the dog as blue.

Restrictions on Content

Restrictions may be placed on content in the 3D AR world, such as by centralized controls or individualized controls.

For instance, advertising may be subject to restrictions on its content (e.g., only family-friendly content allowed until after midnight), format (e.g., size limits or prohibitions on sound), or locations (e.g., advertising may only be displayed in zoned areas). Restrictions on advertisements may be imposed at a central level (e.g., a municipality or neighborhood) or an individual level (e.g., an individual may choose to "block" advertising from being displayed in her AR world).

Content may be filtered or modified as desired. In addition to the ad-blocking example, parents may allow their children to see only age-appropriate content.

Content restrictions may also be imposed by the creator of the content itself. For instance, someone may wear AR jewelry on his body and choose to make it public so that everyone can see the jewelry on him—or limit the visibility of the jewelry to his friends, or even just to himself.

Interactions between AR objects may be selectively restricted as well. An AR object may respond to an incoming interaction in a way that keeps its owner happy while maintaining as much realism as possible. For instance, a beloved AR pet dog may be configured to resist attempts by others to injure it by reacting in several ways: it may automatically dodge an AR sword that would hurt it or, particularly if there is insufficient space for the AR dog to dodge, it may manifest a fantastical "protective shield" to block the AR sword. Of course, the AR dog may simply choose to ignore the AR sword attack and not manifest any reaction, but this type of non-reaction may be detrimental to the illusion of realism of the AR world.

Techniques to Improve Realism of 3D AR Objects

The realism and performance of the 3D AR world will necessarily improve with advances in technology. The availability of more participating devices and more precise and new kinds of sensors, and increases in computing power will all serve to improve the quality of illusion of the 3D AR world until it becomes indistinguishable with the "real" world—at that point, 3D AR objects may be considered just as "real" as physical objects for all intents and purposes.

Until technology improves, certain techniques and practices may be used to improve the illusion of realism. For instance, due to current limitations in the precision of location data, it may be difficult to place an AR object in a precise, constant position relative to physical space. For instance, a dog that is supposed to be sitting still would not seem particularly realistic if it is constantly shifting in its location or orientation due to sensor imprecisions. To mask any imprecision in the position data or calculations, the system may ignore position changes below a certain threshold. It may also make the AR dog more "dynamic"—instead of a sitting dog, it may be preferable to make a constantly moving dog, e.g., one that is constant running or jumping around, rolling over, etc. This way, the animation of the AR dog is rarely or never even trying to hold a constant position, and therefore would mask technical challenges associated with holding an AR object in a constant position.

Another technique that may be employed to hide any difficulty of perfectly positioning AR objects may include making AR objects airborne instead of resting on the ground or another surface, because slight shifts in the position of an airborne object are less detectable by humans and less jarring to the illusion of realism. Yet another technique is to make AR clothing or jewelry somewhat loose or oversized rather than tight-fitting.

Another technical challenge in the early days of AR is to properly render AR objects with realistic or accurate occlusions by physical objects. For instance, it will be difficult to draw an AR bartender accurately standing behind a physical bar and drinks, or to accurately draw an AR tree behind a physical lamppost. Accurately rendering occlusions requires accurately 3D scanning every physical object in the scene, which is difficult. The use of clever artistry may be utilized to hide poor occlusions from the user.

A first technique is that animated AR animals and characters can try to move around the scene in such a way as to minimize the amount of time that they are occluded by physical objects. They may jump over or run in a wide path around short physical objects such as fire hydrants, so as to completely avoid being visually occluded, and/or sprint or leap quickly when passing behind a thin occluding object such as a signpost to minimize the amount of time spent occluded by the object.

A second technique is to design AR personal possessions to always stay close beside the owner, to avoid the likelihood of being far enough away to be behind a physical object. When multiple people in an area are using AR, people's AR possessions would ideally be located in between as many of the people as possible, so that the AR possessions are not behind any person from the perspective of the other people.

A third technique is that AR projectiles (e.g. snowballs) can be made to travel quickly away from the thrower, and can attempt simple animations such as an explosion (rather than complex physics based on the exact scene geometry) when they reach the approximate distance of the target object. Since all the thrower would see would be the projectile quickly receding into the distance and then disappearing, accurate scene geometry data for calculating realistic collisions would not be necessary.

Another technical challenge that creative artistry can help mitigate is the limited field of view of early generation AR eyewear. The limited field of view can be mitigated by one or more of the techniques above, particularly by having the content do its best to dynamically or statically position itself in a convenient location that falls within the device's field of view.

Examples of Applications Using the Invention

The shared 3D AR spaces of the invention may be used for myriad applications including educational, commercial, recreational, and decorative purposes. The possible uses of this invention are limited only by the creativity of its users. Some examples are described below.

3D AR can be used to create fantastical sights and characters, such as seeing Santa on his sleigh, a huge flying dragon, a flying saucer, witches and wizards on flying broomsticks, Aladdin on a flying carpet, or Peter Pan on a flying wooden ship.

3D AR can be used to recreate exotic architecture or vehicles. For instance, schoolchildren in the United States may be able to visit and walk around an AR Taj Mahal. 3D AR can be used to recreate zeppelins, colorful 1800s-era hot air balloons, steam trains, the Titanic, and so forth.

3D AR can provide realistic and detailed demonstrations of construction projects that have not yet been built or are only partially underway, such as a huge and exquisitely detailed representation of a multi-stage rocket large and powerful enough to fly humans to Mars, standing majestically on a launch pad, aimed skyward.

3D AR can enable educational visualizations of objects or aspects of physical reality that exist but are hard to see with the naked eye, such as allowing people to look up in the night sky and see every planet in the solar system magnified to be as detailed and easy to see as our moon (and each planet would be shown in the position that it is really located at, allowing people to become familiar with the orbits of the various planets). Another example is showing magnified, large-scale models of the molecular structures of the various chemicals contained in test tubes and beakers in a chemistry class, and allowing students to watch a molecular animation of the chemical reaction that occurs when various chemicals are mixed. Yet another example is being able to see a bright, slow-motion visualization of each of the electrical signals flowing through the wires in an electrical circuit as the circuit operates.

3D AR may be used to present animals and wildlife, and may allow people to have virtual pets of even very rare exotic animals.

3D AR can be used for virtual treasures in scavenger hunts and geocaches.

3D AR can be used by devices to alter their appearance, such as a drone choosing to appear as a hummingbird, or a lightweight, purely functional, boring-looking real-life space capsule choosing to look like a fantastical mile-long, colorful, luxurious space cruiser with exotic or physically impossible propulsion technologies such as anti-gravity boosters and a warp drive.

What is claimed is:

1. A method for creating a shared 3-dimensional augmented reality space comprising the following ordered steps:
   producing on a central computing device a plurality of renderings of an object in a 3-dimensional augmented reality space;
      wherein each of the plurality of renderings represents a view of the object from one of a plurality of vantage points;
   transmitting from a computing device to the central computing device positional data regarding the position and orientation of the computing device;
   processing the positional data on the central computing device to select a rendering from among the plurality of renderings;
      wherein the selected rendering represents a view of the object that most closely matches the position and orientation of the computing device;

transmitting the selected rendering to the computing device; and processing the selected rendering on the computing device and presenting a 3-dimensional augmented reality space with the object to a user.

2. The method of claim 1 further comprising:

sensing attributes of the real world on a second computing device and generating sensory data regarding attributes of the real world;

transmitting sensory data from the second computing device to the central computing device;

wherein the plurality of renderings account for sensory data received from the second computing device.

3. The method of claim 1 further comprising:

sensing attributes of the real world on an auxiliary sensing device and generating sensory data regarding attributes of the real world;

transmitting sensory data from the auxiliary sensing device to the central computing device;

wherein the plurality of renderings account for sensory data received from the auxiliary computing device.

\* \* \* \* \*